(12) United States Patent
Mori et al.

(10) Patent No.: US 10,883,445 B2
(45) Date of Patent: Jan. 5, 2021

(54) INTERNAL COMBUSTION ENGINE (71) Applicant: HONDA MOTOR CO., LTD., Tokyo (JP)

(72) Inventors: Kensuke Mori, Wako (JP); Hidekatsu Tsutsumi, Wako (JP); Takahiro Iwama, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 16/450,025

(22) Filed: Jun. 24, 2019

(65) Prior Publication Data
US 2020/0011268 A1    Jan. 9, 2020

(30) Foreign Application Priority Data

Jul. 6, 2018  (JP) ................................ 2018-129364

(51) Int. Cl.
*F02F 7/00* (2006.01)
*F16F 15/26* (2006.01)

(52) U.S. Cl.
CPC .......... *F02F 7/0021* (2013.01); *F16F 15/264* (2013.01); *F16F 15/267* (2013.01); *F16F 15/268* (2013.01)

(58) Field of Classification Search
CPC ...... F02F 7/0021; F16F 15/264; F16F 15/267; F16F 15/268
See application file for complete search history.

(56) References Cited

U.S. PATENT DOCUMENTS 9,103,396 B2     8/2015  Iida et al.
2016/0084147 A1* 3/2016  Sotani ................ F01M 1/02
                                                  123/196 A

FOREIGN PATENT DOCUMENTS

JP    S60-045842 U    3/1985
JP    H09-329194 A   12/1997
JP       5847688 B2    1/2016

OTHER PUBLICATIONS

Official Communication dated Mar. 18, 2020 issued over the corresponding Japanese Patent Application No. 2018-129364.

* cited by examiner

*Primary Examiner* — Jacob M Amick
(74) *Attorney, Agent, or Firm* — Carrier Blackman & Associates, P.C.; William D. Blackman; Joseph P. Carrier (57) ABSTRACT

An internal combustion engine includes: a wall body that is formed on a crankcase to accommodate a generator by sandwiching the generator between the wall body and a generator cover coupled to the crankcase from outside; a casing that includes a casing wall, the casing wall being formed on the crankcase and, at a position apart from the wall body in an axial direction of the crankshaft, facing the wall body with a space contiguous to an outer surface of the crankcase sandwiched between the casing wall and the wall body; and a balancer shaft that has an axis thereof parallel to the rotation axis of the crankshaft, and is rotatably supported by the casing while one end of the balancer shaft protrudes from the casing wall into the space. Accordingly, the engine can reduce its weight by shortening the balancer shaft as much as possible without upsetting weight balance.

8 Claims, 8 Drawing Sheets

INTERNAL COMBUSTION ENGINE

BACKGROUND OF THE INVENTION

Field of the Invention

The present invention relates to an internal combustion engine comprising: a crankcase that supports a crankshaft rotatably around a rotation axis; a generator that is coupled to one end of the crankshaft at an outside of the crankcase; a wall body that is formed on the crankcase to accommodate the generator by sandwiching the generator between the wall body and a generator cover coupled to the crankcase from the outside.

Description of the Related Art

Disclosed in Japanese Patent No. 5847688 is an internal combustion engine including a generator that is coupled to one end of a crankshaft at the outside of a crankcase. A generator cover is coupled to the crankcase. The generator cover defines an accommodation space for the generator by sandwiching it between the generator cover and a wall body of the crankcase. In the accommodation space for the generator, one end of a balancer shaft protrudes from the wall body of the crankcase. The balancer shaft has an axis thereof parallel to the rotation axis of the crankshaft.

The balancer shaft supports a driven gear and an eccentric weight. The driven gear meshes with a driving gear that is fastened to the crankshaft. The action of the driven gear causes the eccentric weight to rotate in operative connection with the rotation of the crankshaft and thus reduce the vibration of the internal combustion engine.

The balancer shaft is supported at both ends. Therefore, positioning the balancer shaft at a distance from the accommodation space for the generator in the axial direction of the crankshaft requires that the wall body be increased in thickness. Increasing the thickness of the wall body increases the weight of the internal combustion engine. Meanwhile, if the balancer shaft is shortened while avoiding the increase in the thickness of the wall body, the balancer shaft is disproportionately disposed toward the generator to upset the weight balance of the internal combustion engine.

SUMMARY OF THE INVENTION

The present invention has been made in view of the above circumstances. It is an object of the present invention to provide an internal combustion engine that is capable of reducing its weight by shortening a balancer shaft as much as possible without upsetting the weight balance.

In order to achieve the object, according to a first aspect of the present invention, there is provided an internal combustion engine comprising: a crankcase that supports a crankshaft rotatably around a rotation axis; a generator that is coupled to one end of the crankshaft at an outside of the crankcase; a wall body that is formed on the crankcase to accommodate the generator by sandwiching the generator between the wall body and a generator cover coupled to the crankcase from the outside; a casing that includes a casing wall, the casing wall being formed on the crankcase and, at a position apart from the wall body in an axial direction of the crankshaft, facing the wall body with a space contiguous to an outer surface of the crankcase sandwiched between the casing wall and the wall body; and a balancer shaft that has an axis thereof parallel to the rotation axis of the crankshaft, and is rotatably supported by the casing while one end of the balancer shaft protrudes from the casing wall into the space.

According to the first aspect, the balancer shaft is disposed apart from the wall body and supported on the casing, the wall body forming the accommodation space for the generator. This makes it possible to avoid an increase in the thickness of the wall body. The weight of the internal combustion engine can be reduced. Further, even when the balancer shaft is shortened, the balancer shaft need not be disproportionately disposed with respect to the whole internal combustion engine. Consequently, the weight balance of the internal combustion engine is properly maintained.

According to a second aspect of the present invention, in addition to the first aspect, there is provided the internal combustion engine, further comprising: a cylinder block that defines a plurality of cylinders; and a partition wall that is formed on the crankcase to support a journal of the crankshaft with respect to each of the cylinders; wherein the casing supports an other end of the balancer shaft, the casing being continuous from the partition wall corresponding to an inside-positioned cylinder out of the cylinders.

According to the second aspect, the balancer shaft, which is heavy, can be disposed close to the center of mass of the internal combustion engine. Consequently, the weight balance of the internal combustion engine is properly maintained.

According to a third aspect of the present invention, in addition to the first aspect, a through-hole is formed in the wall body, the through-hole being coaxial with the balancer shaft and larger in outside diameter than the balancer shaft.

According to the third aspect, the balancer shaft is insertable from the through-hole in the wall body toward the casing while the generator cover is removed. Consequently, the balancer shaft is adjustable.

According to a fourth aspect of the present invention, in addition to the third aspect, a perforator for a support hole is insertable into the through-hole, the support hole being bored in the casing in relation to the balancer shaft.

According to the fourth aspect, even when the central axis of the support hole in the casing overlaps with the wall body, inserting the perforator into the through-hole makes it easy to machine the support hole.

According to a fifth aspect of the present invention, in addition to the third aspect, there is provided the internal combustion engine, further comprising: a plug member that is inserted into the through-hole from the outside of the crankcase in order to plug the through-hole; and a retainer that is formed on the generator cover, the retainer being brought into contact with the plug member when the generator cover is coupled to the crankcase from the outside of the crankcase.

According to the fifth aspect, the plug member prevents dust from entering a space contiguous to the outer surface of the crankcase and moving toward the accommodation space for the generator. When the generator cover is coupled to the crankcase, the retainer on the generator cover prevents the plug member from leaving the wall body.

According to a sixth aspect of the present invention, in addition to the first aspect, the balancer shaft is disposed outside an outer edge of a rotor of the generator when viewed laterally.

According to the sixth aspect, even after the rotor of the generator is mounted on the crankshaft, the balancer shaft is adjustable through the through-hole.

According to a seventh aspect of the present invention, in addition to the first aspect, the crankcase includes an upper body and a lower body that are separated by a cut surface, and the axis of the balancer shaft is disposed below the cut surface, forward of the crankshaft, and above a horizontal plane in contact with a lower end of the rotor of the generator.

According to the seventh aspect, the balancer shaft can be disposed close to the crankshaft so as to position the balancer shaft close to the center of gravity of the internal combustion engine. Consequently, the weight balance of the internal combustion engine is properly achieved.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will now be described with reference to the accompanying drawings. All references to directions, such as up, down, front, rear, left, and right with respect to a vehicle body, are defined based on the viewpoint of a rider riding on a two-wheeled motor vehicle.

Figure 1:
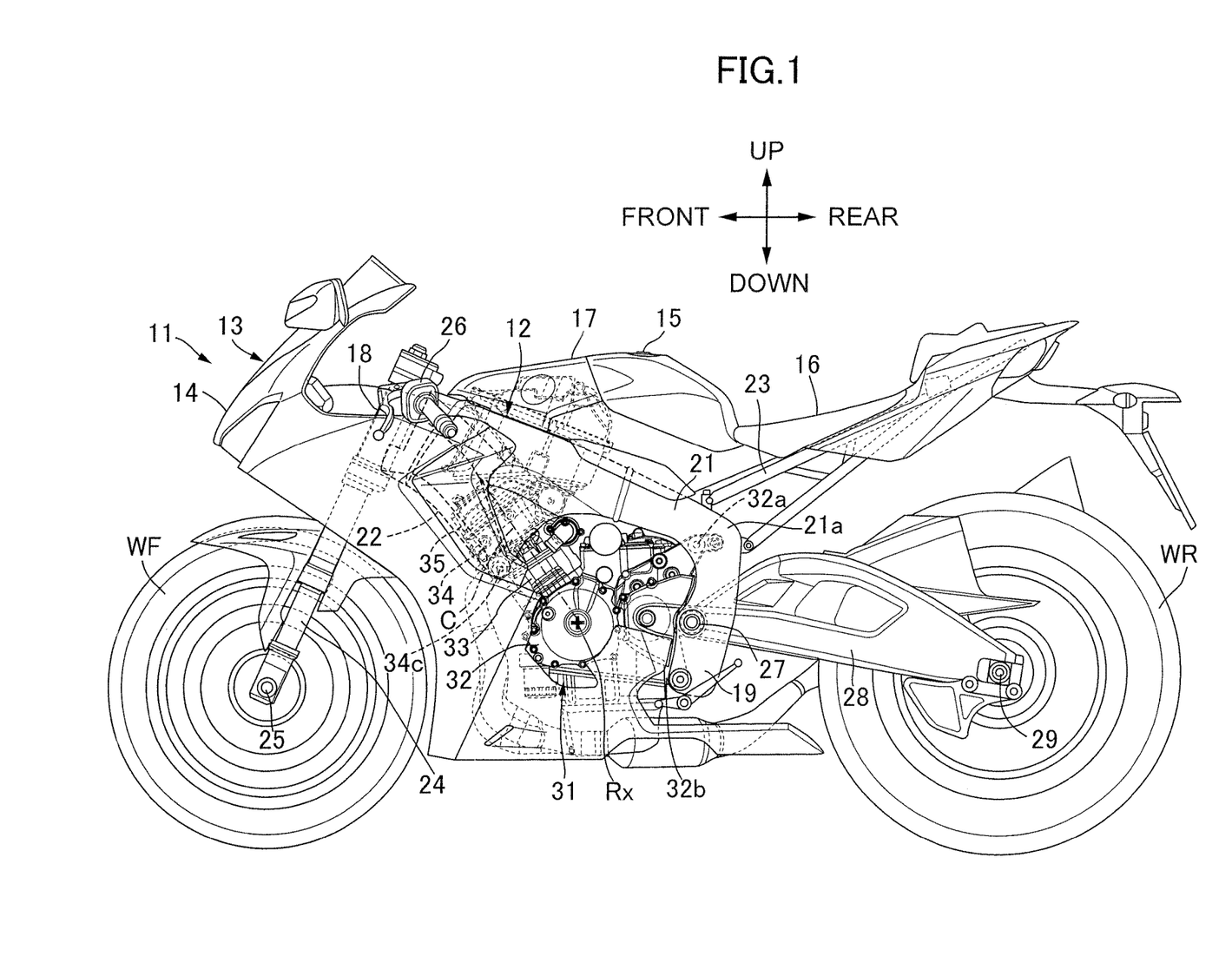
FIG. 1 is a side view schematically illustrating an overall configuration of a two-wheeled motor vehicle according to an embodiment of the present invention.

FIG. 1 schematically represents an overall view of a two-wheeled motor vehicle according to the embodiment of the present invention, that is, a saddle-ride type vehicle. The two-wheeled motor vehicle 11 includes a vehicle body frame 12 and a vehicle body cover 13. The vehicle body cover 13 is installed over the vehicle frame 12. The vehicle body cover 13 includes a front cowl 14 and a tank cover 17. The front cowl 14 covers the vehicle body frame 12 from its front. The tank cover 17 is extended forward from the outer surface of a fuel tank 15 and connected to an occupant seat 16 positioned behind the fuel tank 15. The fuel tank 15 stores fuel. When driving the two-wheeled motor vehicle 11, the rider straddles the occupant seat 16.

The vehicle body frame 12 includes a head pipe 18, a pair of left and right main frames 21, a down frame 22, and left and right seat frames 23. The main frames 21 are extended downward and rearward from the head pipe 18, and include a pivot frame 19 at a lower rear end. The down frame 22 is extended downward from the head pipe 18 at a position below the main frames 21 and integrated with the main frames 21. The seat frames 23 are extended upward and rearward from a curved area 21a of the main frames 21 in order to form a truss structure. The occupant seat 16 is supported by the seat frames 23.

The head pipe 18 steerably supports a front fork 24. The front fork 24 supports a front wheel WF rotatably around an axle 25. A steering handlebar 26 is coupled to the upper end of the front fork 24. When driving the two-wheeled motor vehicle 11, the rider grasps grips at the left and right ends of the steering handlebar 26.

A swing arm 28 is coupled to the vehicle body frame 12 in the rear of the vehicle in such a manner as to permit the swing arm 28 to swing in the up-down direction around a pivot 27. A rear wheel WR is supported by the rear end of the swing arm 28 in such a manner as to permit the rear wheel WR to rotate around an axle 29. An internal combustion engine 31 is disposed between the front wheel WF and the rear wheel WR and mounted on the vehicle body frame 12. The internal combustion engine 31 generates the driving force to be transmitted to the rear wheel WR. The power of the internal combustion engine 31 is transmitted to the rear wheel WR through a transmission device.

The internal combustion engine 31 includes a crankcase 32, a cylinder block 33, a cylinder head 34, and a head cover 35. The crankcase 32 includes engine hangers 32a and 32b and outputs power around a rotation axis Rx. The engine hangers 32a and 32b are disposed at the upper and lower ends of a rear wall and coupled to the main frames 21. The cylinder block 33 is coupled to the crankcase 32, and has a cylinder axis C. The cylinder axis C is disposed in a vertical plane orthogonal to the rotation axis Rx and upright with respect to a horizontal plane. The cylinder head 34 is coupled to the upper end of the cylinder block 33, includes an engine hanger 34c disposed on a front wall and coupled to the down frame 22, and supports a valve train. The head cover 35 is coupled to the upper end of the cylinder head 34 to cover the valve train on the cylinder head 34.

Figure 2:
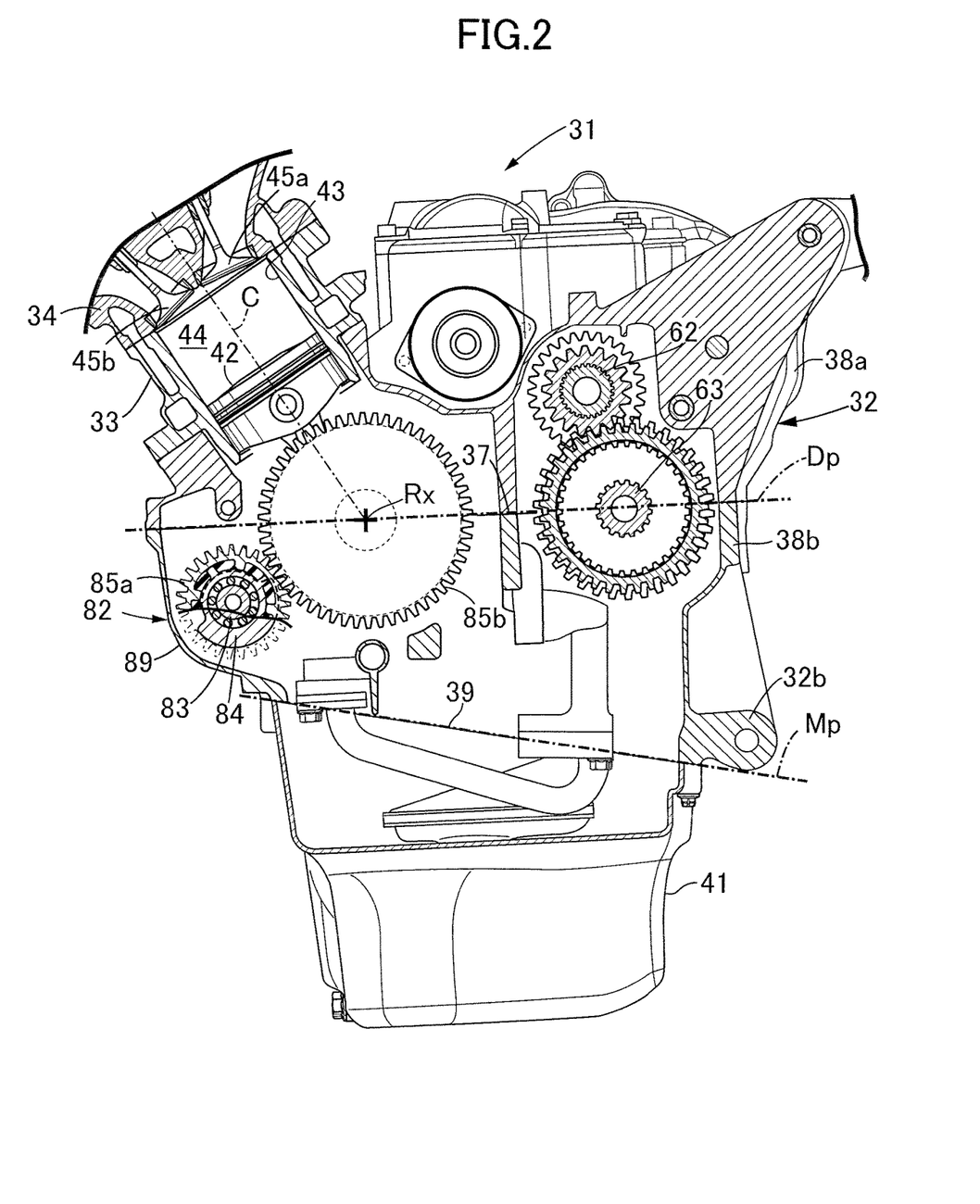
FIG. 2 is an enlarged side view illustrating an internal combustion engine as viewed from a section orthogonal to the rotation axis of a crankshaft.

As illustrated in FIG. 2, the crankcase 32 is divided into an upper body 38a and a lower body 38b by a cut surface 37 that is defined in a horizontal plane Dp. An oil pan 41 is coupled to the crankcase 32 from below by a mating surface 39. The mating surface 39 is defined in an imaginary plane Mp that intersects, at a predetermined inclination angle, the horizontal plane Dp including the cut surface 37. The line of intersection between the imaginary plane Mp and the horizontal plane Dp is set in parallel with the rotation axis Rx of a crankshaft. The mating surface 39 is sloped downward and rearward from a front edge. A rear edge of the mating surface 39 is positioned below the engine hanger 32b, which is disposed at the lower end of the crankcase 32.

Cylinders 43 are formed in the cylinder block 33. The cylinders 43 guide linear reciprocating motions of pistons 42 along the cylinder axis C. In the cylinder block 33, four cylinders 43 are arranged along the rotation axis Rx so that the internal combustion engine 31 has a so-called in-line four-cylinder configuration. Partitioning is done so that a combustion chamber 44 is disposed between the piston 42 and the cylinder head 34. An intake valve 45a and an exhaust valve 45b open and close in accordance with the rotation of a camshaft so that an air-fuel mixture is introduced into the combustion chamber 44 and that burned exhaust gas is exhausted from the combustion chamber 44.

Figure 3:
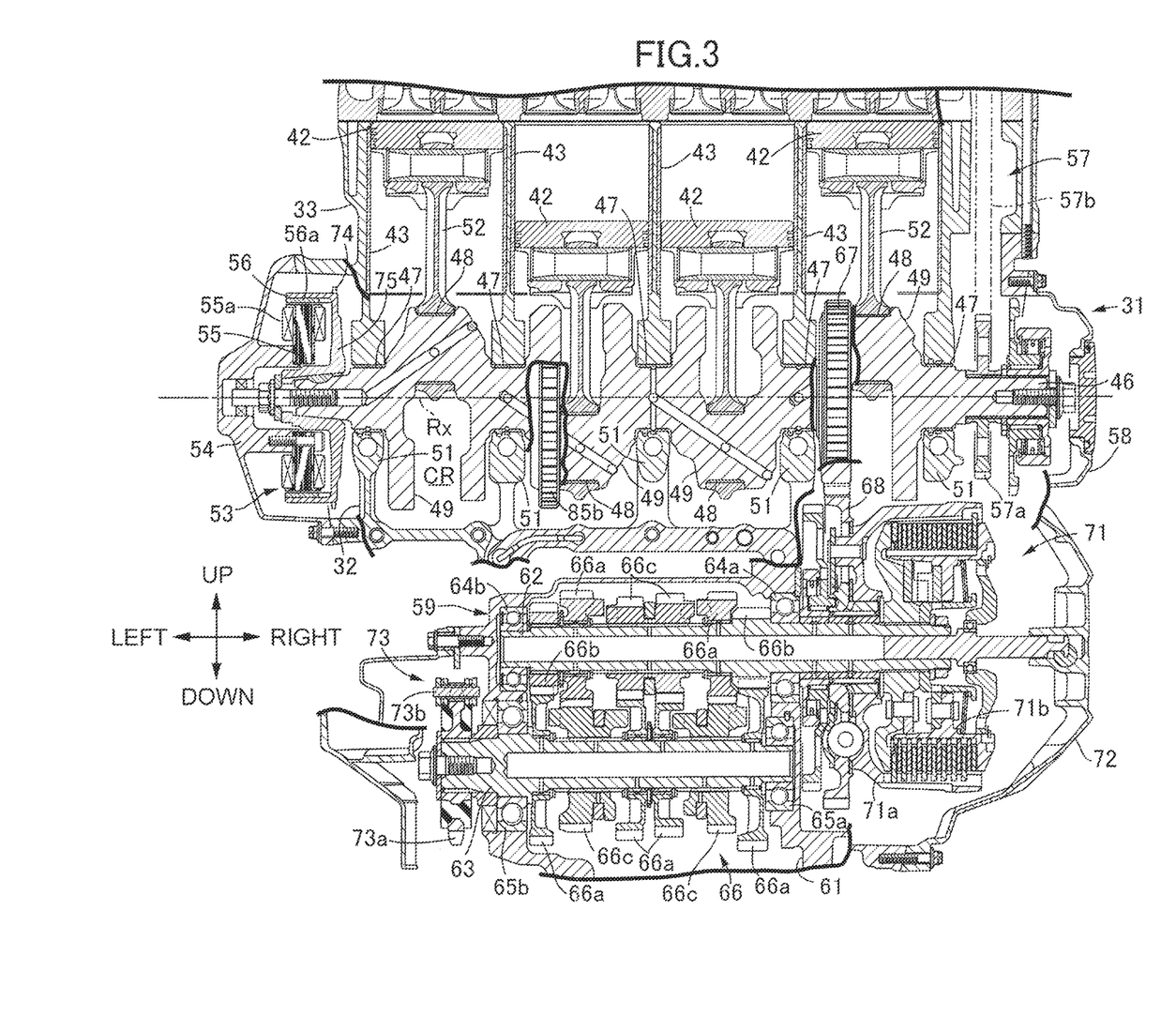
FIG. 3 is an enlarged sectional view of the internal combustion engine schematically illustrating a structure as viewed from a section containing the rotation axis of the crankshaft, the axis of a main shaft, and the axis of a countershaft.

As illustrated in FIG. 3, the crankcase 32 supports the crankshaft 46 rotatably around the rotation axis Rx. The crankshaft 46 includes journals 47 and a crank 49. The journals 47 are formed coaxially with the rotation axis Rx. The crank 49 has a crankpin 48 that is disposed between neighboring journals 47 and extended in parallel with the rotation axis Rx to couple crank webs with each other. A partition wall 51 is formed on the crankcase 32 to support each journal 47 rotatably around a sliding bearing with respect to each of the cylinders 43. A large end portion of a connecting rod 52 extended from the piston 42 is rotatably coupled to the crankpin 48. The connecting rod 52 converts the linear reciprocating motion of the piston 42 to rotary motion of the crankshaft 46.

One end of the crankshaft 46 protrudes outward from the partition wall 51 that forms a left side surface of the crankcase 32. An alternating-current generator (ACG) 53 is connected to the one end of the crankshaft 46. An ACG cover 54 is coupled to the left side surface of the crankcase 32. The ACG 53 is accommodated between the ACG cover 54 and the crankcase 32.

The ACG 53 includes a stator 55 and a rotor 56. The stator 55 is fastened to the ACG cover 54. The rotor 56 is relatively unrotatably coupled to the one end of the crankshaft 46 that protrudes from the crankcase 32. The stator 55 has a plurality of coils 55a that are arrayed in the peripheral direction around the crankshaft 46 and wound around a stator core. The rotor 56 has a plurality of magnets 56a that are arrayed in the peripheral direction along an annular orbit surrounding the stator 55. When the crankshaft 46 rotates, the magnets 56a are relatively displaced with respect to the coils 55a. This causes the ACG 53 to generate electrical power.

The other end of the crankshaft 46 protrudes outward from the partition wall 51 that forms a right side surface of the crankcase 32. A valve train 57 for transmitting power to the camshaft is coupled to the other end of the crankshaft 46. The valve train 57 includes a driving cam gear 57a, a driven cam gear (not depicted), and a cam gear train 57b. The driving cam gear 57a is fastened coaxially with the crankshaft 46. The driven cam gear is fastened to the camshaft. The cam gear train 57b includes a plurality of gears that sequentially mesh with the driving cam gear 57a and then with the driven cam gear in order to transmit power from the driving cam gear 57a to the driven cam gear. A valve train cover 58 is coupled to the right side surface of the crankcase 32 in order to accommodate the driving cam gear 57a between the crankcase 32 and the valve train cover 58. The ACG cover 54 and the valve train cover 58 define a crank chamber CR that covers the outer surface of the crankcase 32 to accommodate the crankshaft 46. The valve train 57 may include a driving sprocket, a driven sprocket, and a cam chain instead of the driving cam gear 57a, the driven cam gear, and the cam gear train 57b.

The internal combustion engine 31 incorporates a dog-clutch multi-speed transmission (hereinafter referred to as the "transmission") 59. The transmission 59 is accommodated in a transmission chamber 61 that is defined continuously from the crank chamber CR by the crankcase 32. The transmission 59 includes a main shaft 62 and a countershaft 63. The axes of the main shaft 62 and countershaft 63 are parallel to the axis of the crankshaft 46. The crankcase 32 supports the main shaft 62 and the countershaft 63 rotatably around rolling bearings 64a, 64b, 65a, and 65b.

The main shaft 62 and the countershaft 63 support a plurality of transmission gears 66. The transmission gears 66 are disposed between the rolling bearings 64a and 64b and between the rolling bearings 65a and 65b, and accommodated in the transmission chamber 61. The transmission gears 66 include a rotary gear 66a, a fixed gear 66b, and a shift gear 66c. The rotary gear 66a is disposed coaxially with the main shaft 62 or the countershaft 63, and relatively rotatably supported by the main shaft 62 or the countershaft 63. The fixed gear 66b is relatively unrotatably fastened to the main shaft 62, and disposed in mesh with the corresponding rotary gear 66a. The shift gear 66c is relatively unrotatably and axially displaceably supported by the main shaft 62 or the countershaft 63, and disposed in mesh with the corresponding rotary gear 66a. The axial displacement of the rotary gear 66a and fixed gear 66b is regulated. When the shift gear 66c is coupled to the rotary gear 66a through axial displacement, the relative rotation of the rotary gear 66a with respect to the main shaft 62 or the countershaft 63 is regulated. When the shift gear 66c meshes with the fixed gear 66b of a different shaft, rotary motive power is transmitted between the main shaft 62 and the countershaft 63. When the shift gear 66c is coupled to the rotary gear 66a meshing with the fixed gear 66b of a different shaft, rotary motive power is transmitted between the main shaft 62 and the countershaft 63. When specific transmission gears 66 mesh between the main shaft 62 and the countershaft 63 as described above, rotary motive power is transmitted from the main shaft 62 to the countershaft 63 at a predetermined reduction ratio.

One end of the main shaft 62 protrudes outward from the right side surface of the crankcase 32. At the outside of the crankcase 32, a primary driven gear 68 meshing with a primary driving gear 67 of the crankshaft 46 is relatively rotatably and coaxially supported by the one end of the main shaft 62. The primary driving gear 67 is, for example, formed integrally with the crank 49 of the crankshaft 46.

On the main shaft 62, a friction clutch 71 is coupled to the primary driven gear 68. A clutch cover 72 is coupled to the right side surface of the crankcase 32. The clutch cover 72 accommodates the friction clutch 71 between the crankcase 32 and the clutch cover 72. The friction clutch 71 includes a clutch outer 71a and a clutch hub 71b. The primary driven gear 68 is coupled to the clutch outer 71a. In accordance with an operation of a clutch lever, the friction clutch 71 is able to selectively couple or decouple the clutch outer 71a and the clutch hub 71b.

A driving sprocket 73a of the transmission device 73 disposed outside the crankcase 32 is coupled to the countershaft 63. A drive chain 73b is wound around the driving sprocket 73a. The drive chain 73b transmits the rotary motive power of the driving sprocket 73a to the rear wheel WR.

A pulser ring 75 is attached to the crankshaft 46. The pulser ring 75, which is disposed between the rotor 56 of the ACG 53 and the crankcase 32, includes a reluctor 74 that is coaxially and annularly disposed on the crankshaft 46. The pulser ring 75 is, for example, fastened to (integrated with) the rotor 56 of the ACG 53. The reluctor 74 protrudes radially outward from the outer periphery of the rotor 56. The pulser ring 75 is formed, for example, of a magnetic substance.

Figure 4:
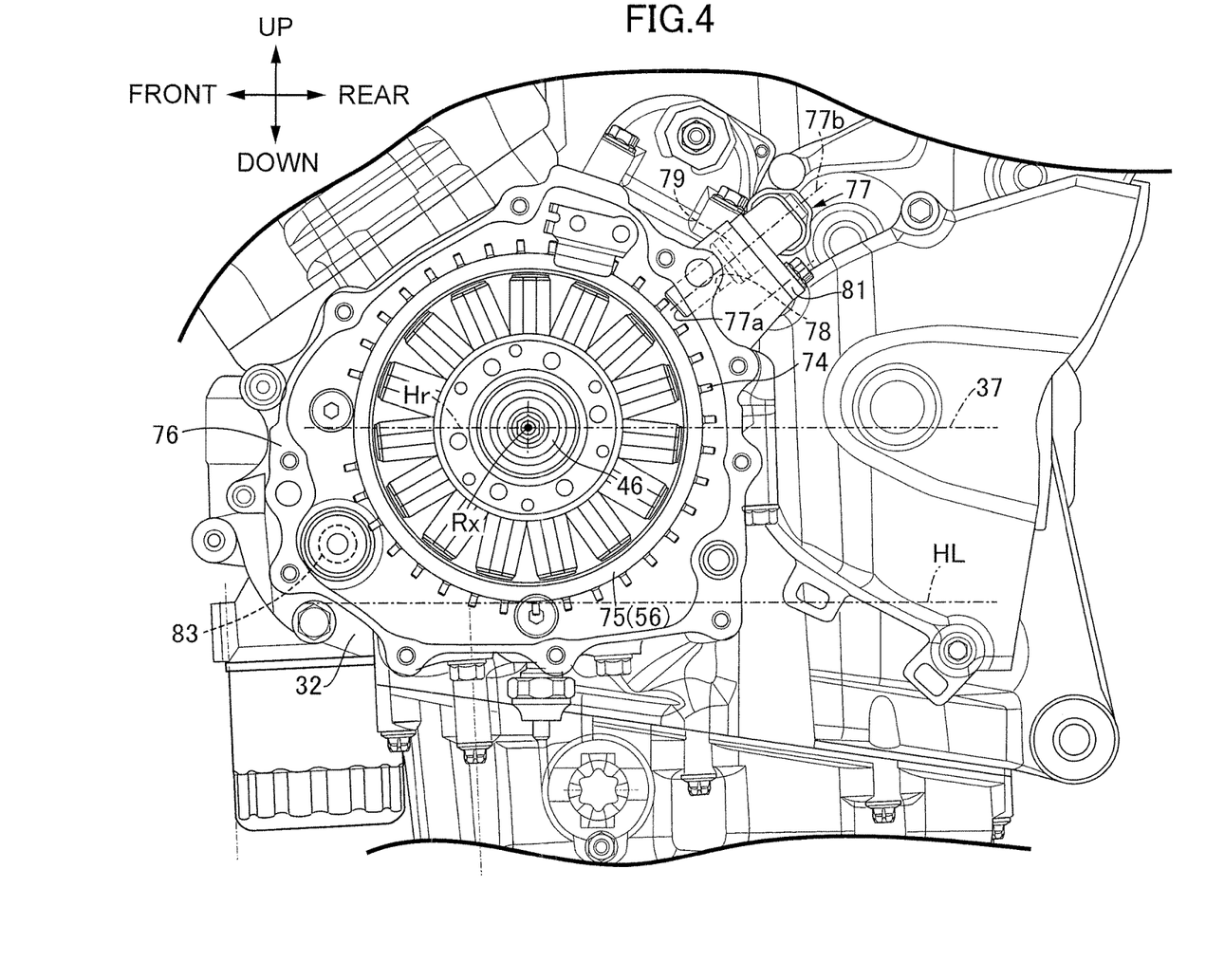
FIG. 4 is an enlarged side view illustrating a state where a generator (ACG: alternating-current generator) cover is removed.

As illustrated in FIG. 4, a surrounding wall 76 is formed on the crankcase 32. The surrounding wall 76, which is upright from the left side surface of the crankcase 32, surrounds the rotor 56 around the rotation axis Rx of the crankshaft 46. A pulser sensor 77 is attached to the surrounding wall 76. The pulser sensor 77 is disposed at a detection end 77a to face the orbit of the reluctor 74 and generate a pulse signal in accordance with the motion of the reluctor 74. The pulser sensor 77 includes a sensor main body 79 and a mounting piece 81. The sensor main body 79 is inserted from the outside into a sensor hole 78 to face the detection end 77a toward a space sandwiched between the partition wall 51 and the ACG cover 54. The sensor hole 78 is bored in the surrounding wall 76 at a position above a horizontal plane Hr including the rotation axis Rx of the crankshaft 46. The mounting piece 81 coupled to the sensor main body 79, laid over the outer surface of the surrounding wall 76 at the outside of the sensor hole 78, and fastened to the crankcase 32.

The detection end 77a of the pulser sensor 77 faces the orbit of the reluctor 74, which is disposed at equal intervals along a plane orthogonal to the rotation axis Rx of the crankshaft 46. The action, for example, of a magnetoresistive element causes the pulser sensor 77 to output an electrical signal, that is, a pulse signal, in accordance with the presence of a magnetic substance detected on the orbit of the reluctor 74. The pulse signal identifies the angular position of the crankshaft 46. The pulse sensor 77 is configured so that a detection axis 77b having the highest sensitivity is directed toward the rotation axis Rx.

As illustrated in FIG. 2, a secondary balancer 82 is accommodated in the crankcase 32. The secondary balancer 82 is disposed forward of the crankshaft 46 and operatively connected with the crankshaft 46. The secondary balancer 82 includes an eccentric weight 84 and a balancer driven gear 85a. The eccentric weight 84 is supported rotatably by a balancer shaft 83 around an axis parallel to the rotation axis Rx of the crankshaft 46. The balancer driven gear 85a is supported by the balancer shaft 83 rotatably and coaxially with the eccentric weight 84, and coupled to the eccentric weight 84. The balancer driven gear 85a may be supported by and fastened to the eccentric weight 84. The balancer driven gear 85a meshes with a driving gear 85b that is fastened to the crankshaft 46. Upon receiving the driving force of the driving gear 85b, the balancer driven gear 85a causes the eccentric weight 84 to rotate around the balancer shaft 83. As illustrated in FIG. 3, the driving gear 85b is formed integrally with the crank 49 of the crankshaft 46.

Figure 5:
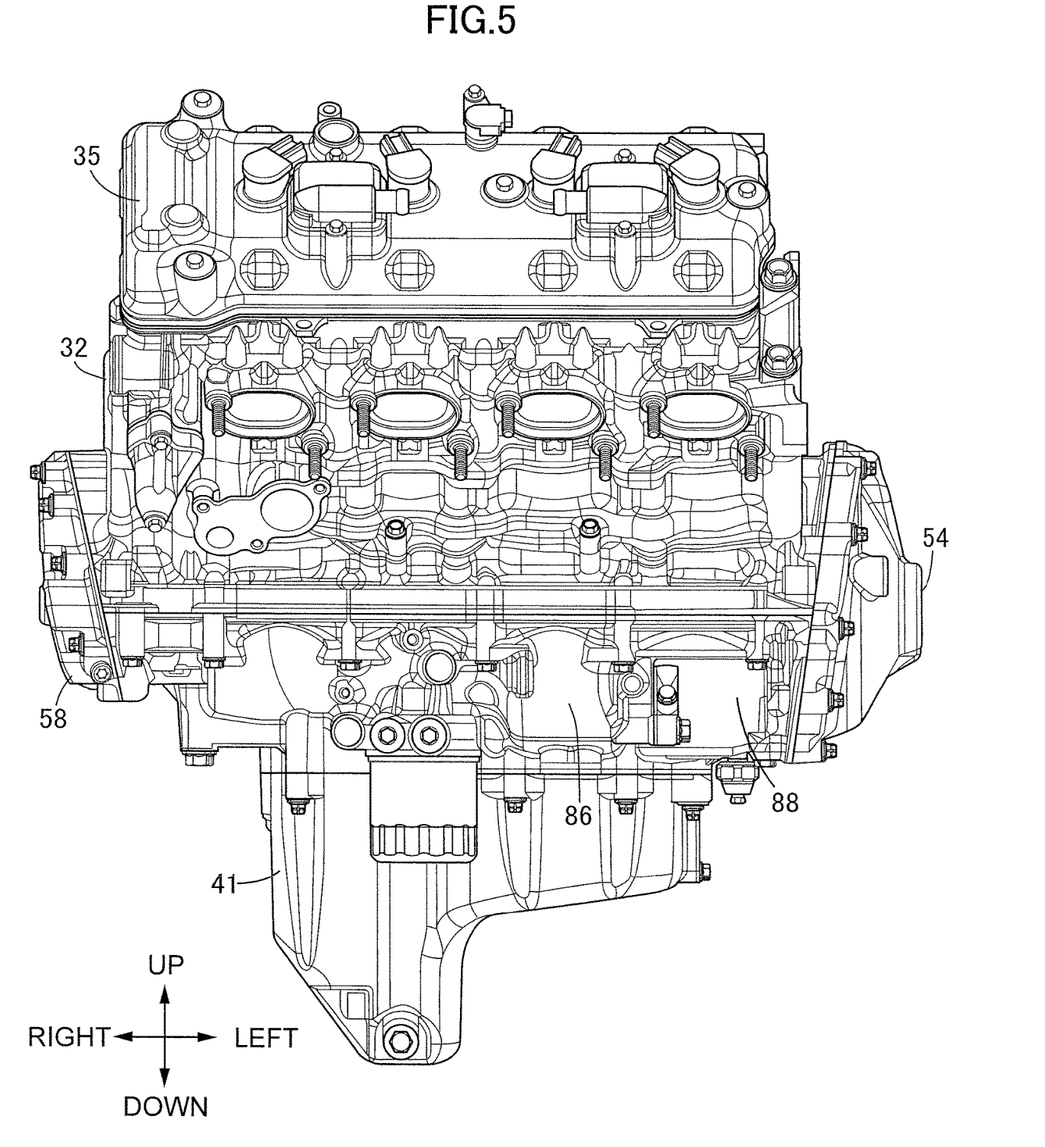
FIG. 5 is an enlarged front view illustrating the internal combustion engine.
Figure 6:
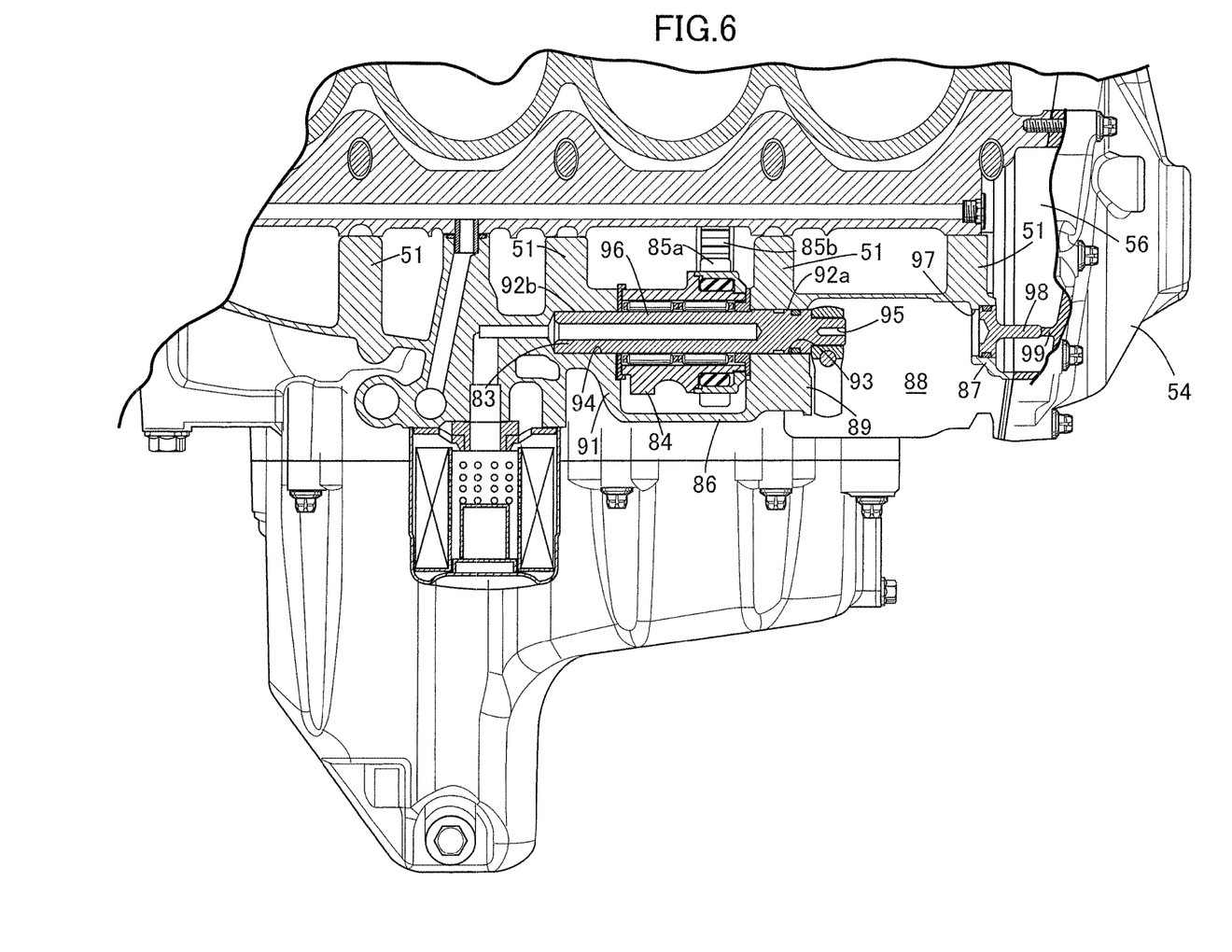
FIG. 6 is an enlarged partial sectional view of the internal combustion engine as viewed from a section containing the axis of a balancer shaft.

As illustrated in FIG. 5, a casing 86 is formed on a front wall of the crankcase 32 continuously from the crank chamber CR. The casing 86 defines a space for accommodating the eccentric weight 84 and the balancer driven gear 85a. As illustrated in FIG. 6, a wall body 87 is formed on the crankcase 32 continuously from the partition wall 51. The wall body 87 accommodates the ACG 53 between the ACG cover 54 and the wall body 87.

The casing 86 includes a first casing wall 89 and a second casing wall 91. At a position apart from the wall body 87 in the axial direction of the crankshaft 46, the first casing wall 89 faces the wall body 87 with a space 88 contiguous to the front wall of the crankcase 32 sandwiched in between. The second casing wall 91 faces the first casing wall 89 with an accommodation space for the eccentric weight 84 and the balancer driven gear 85a sandwiched in between. The first casing wall 89 is continuous from the partition wall 51 that is disposed between an outside-positioned cylinder 43 and an inside-positioned cylinder 43. The second casing wall 91 is continuous from the partition wall 51 that is disposed between inside-positioned cylinders 43.

The balancer shaft 83 includes a first spindle 92a and a second spindle 92b. The first spindle 92a and the second spindle 92b are disposed at one end and the other end of the balance shaft 83. The first spindle 92a and the second spindle 92b have an axis thereof which is parallel to the rotation axis Rx of the crankshaft 46 and eccentric from the rotation axis of the eccentric weight 84. The first spindle 92a is supported as it is inserted into a support hole 93 bored in the first casing wall 89. The second spindle 92b is supported as it is inserted into a support hole 94 bored in the second casing wall 91.

One end of the balancer shaft 83 protrudes from the first casing wall 89 into the space 88, and a tip end of the one end faces the wall body 87. A groove 95 is formed in the tip end facing the wall body 87. The groove 95 is formed for a tool that is used to rotate the balancer shaft 83 around the axis of the first and second spindles 92a and 92b. The eccentric weight 84 is mounted on an eccentric shaft 96 through the rolling bearings. The second spindle 92b and the eccentric shaft 96 are disposed inside an imaginary cylindrical surface that is defined by the cylindrical surface of the first spindle 92a.

A through-hole 97 is formed in the wall body 87. The through-hole 97 is coaxial with the first spindle 92a of the balancer shaft 83 and larger in outside diameter than the balancer shaft 83. The through-hole 97 has a large-diameter portion that is positioned on the ACG 53 side. A plug member 98 for plugging the through-hole 97 is liquid-tightly inserted into the large-diameter portion of the through-hole 97 from the outside of the crankcase 32. A retainer 99 is formed on the generator cover 54. The retainer 99 comes into contact with the plug member 98 when the generator cover 54 is coupled to the crankcase 32 from the outside of the crankcase 32.

As illustrated in FIG. 4, when viewed laterally, the balancer shaft 83 is disposed outside an outer edge of the rotor 56 of the ACG 53. The axis of the balancer shaft 83 is disposed below the cut surface 37, forward of the crankshaft 46, and above a horizontal plane HL in contact with the lower end of the rotor 56 of the ACG 53.

An operation of the present embodiment will now be described. When the internal combustion engine 31 operates, the piston 42 linearly reciprocates along the cylinder axis C within a cylinder 43. The action of the connecting rod 52 causes the crankshaft 46 to rotate around the rotation axis Rx. In this instance, the rotational force of the crankshaft 46 is transmitted from the driving gear 85b of the crankshaft 46 to the balancer driven gear 85a of the secondary balancer 82 at a predetermined reduction ratio. The eccentric weight 84 rotates around the eccentric shaft 96 of the balancer shaft 82. The action of the balancer driven gear 85a causes the eccentric weight 84 to rotate in operative connection with the rotation of the crankshaft 46 and thus reduce the vibration of the internal combustion engine 31.

In the internal combustion engine 31 according to the present embodiment, the casing 86 includes the first casing wall 89. At a position apart from the wall body 87 in the axial direction of the crankshaft 46, the first casing wall 89 faces the wall body 87 with the space 88 sandwiched in between. The balancer shaft 83 of the secondary balancer 82 has an axis parallel to the rotation axis Rx of the crankshaft 46, and is rotatably supported by the casing 86 while one end of the balancer shaft 83 is protruded from the first casing wall 89 into the space 88 contiguous to the outer surface of the crankcase 32. The balancer shaft 83 is disposed apart from the wall body 87, which forms an accommodation space for the ACG 53, and supported by the casing 86. This prevents the wall body 87 from increasing its thickness, and thus reduces the weight of the internal combustion engine 31. Additionally, even when the balancer shaft 83 is shortened, the balancer shaft 83 need not be disproportionately disposed with respect to the whole internal combustion engine 31. Consequently, the weight balance of the internal combustion engine 31 is properly maintained.

In the present embodiment, the casing 86 supports the other end of the balancer shaft 83 continuously from the partition wall 51 corresponding to an inside-positioned cylinder 43. As the balancer shaft 83, which is heavy, is disposed close to the center of mass of the internal combustion engine 31, the weight balance of the internal combustion engine 31 is properly maintained.

In the present embodiment, the axis of the balancer shaft 83 is disposed below the cut surface 37, forward of the crankshaft 46, and above the horizontal plane HL in contact with the lower end of the rotor 56 of the ACG 53. The balancer shaft 83 is disposed close to the crankshaft 46 and thus positioned close to the center of gravity of the internal combustion engine 31. Therefore, the weight balance of the internal combustion engine 31 is properly achieved.

Figure 7:
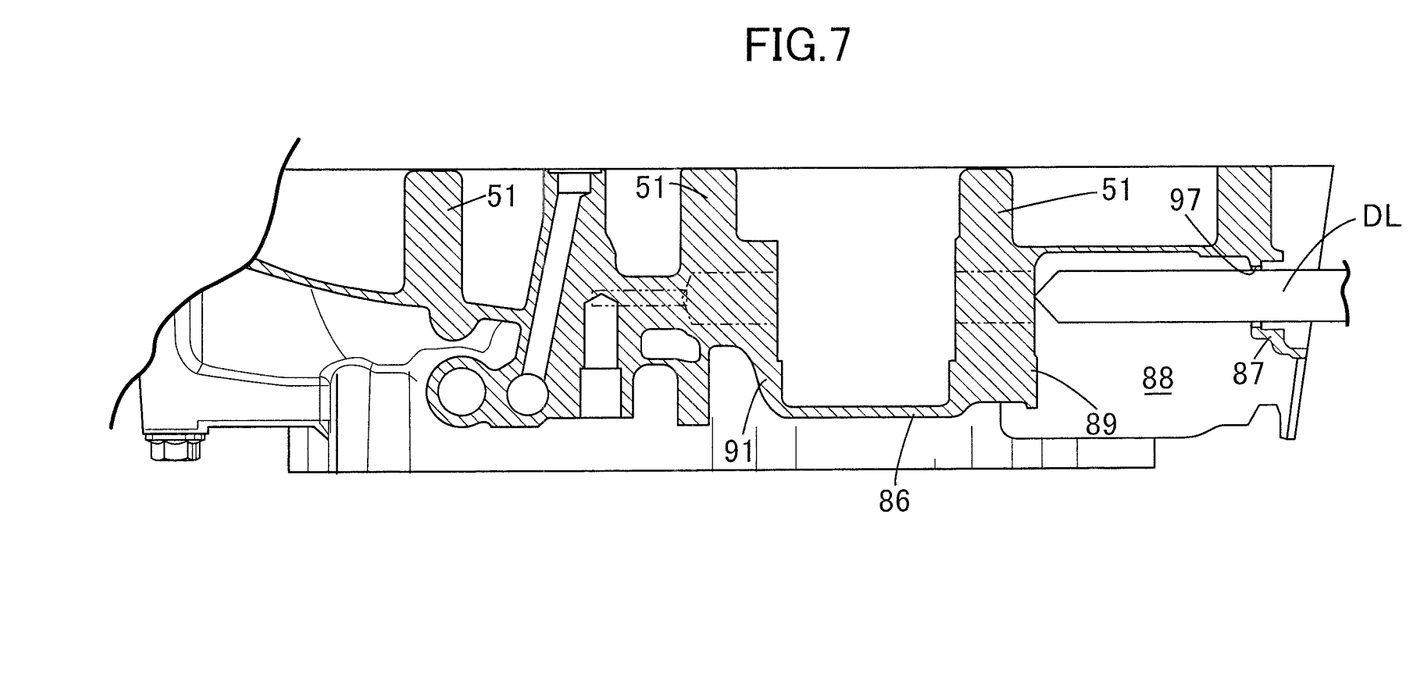
FIG. 7 is an enlarged partial sectional view schematically illustrating a process of forming a support hole in a first casing wall during the manufacture of the internal combustion engine.

During the manufacture of the internal combustion engine 31, the support hole 93 is bored in the first casing wall 89. In this instance, as illustrated in FIG. 7, a drill (perforator) DL is inserted through the through-hole 97 of the wall body 87 so as to reach the first casing wall 89. Next, the support hole 94 is bored in the second casing wall 91. In this instance, the drill passes through the through-hole 97 of the wall body 87 and the support hole 93 of the first casing wall 89. Therefore, the through-hole 97 makes it possible to properly form the support hole 93 and the support hole 94. Even when the central axis of the support hole 94 of the casing 86 overlaps with the wall body 87, inserting the drill into the through-hole 97 makes it easy to machine the support hole 94.

The balancer shaft 83 is inserted from the support hole 93 toward the support hole 94. In the wall body 87 facing the ACG cover 54, the through-hole 97 larger in outside diameter than the balancer shaft 83 is formed coaxially with the balancer shaft 83. Therefore, the balancer shaft 83 can be inserted from the through-hole 97 of the wall body 87 toward the casing 86.

The through-hole 97 is plugged by the plug member 98. The plug member 98 prevents dust from entering the space 88 contiguous to the outer surface of the crankcase 32 and moving toward the accommodation space for the ACG 53. When the ACG cover 54 is coupled to the crankcase 32, the retainer 99 on the ACG cover 54 comes into contact with the plug member 98. When the ACG cover 54 is coupled to the crankcase 32 as described above, the retainer 99 on the ACG cover 54 prevents the plug member 98 from leaving the wall body 87.

Figure 8:
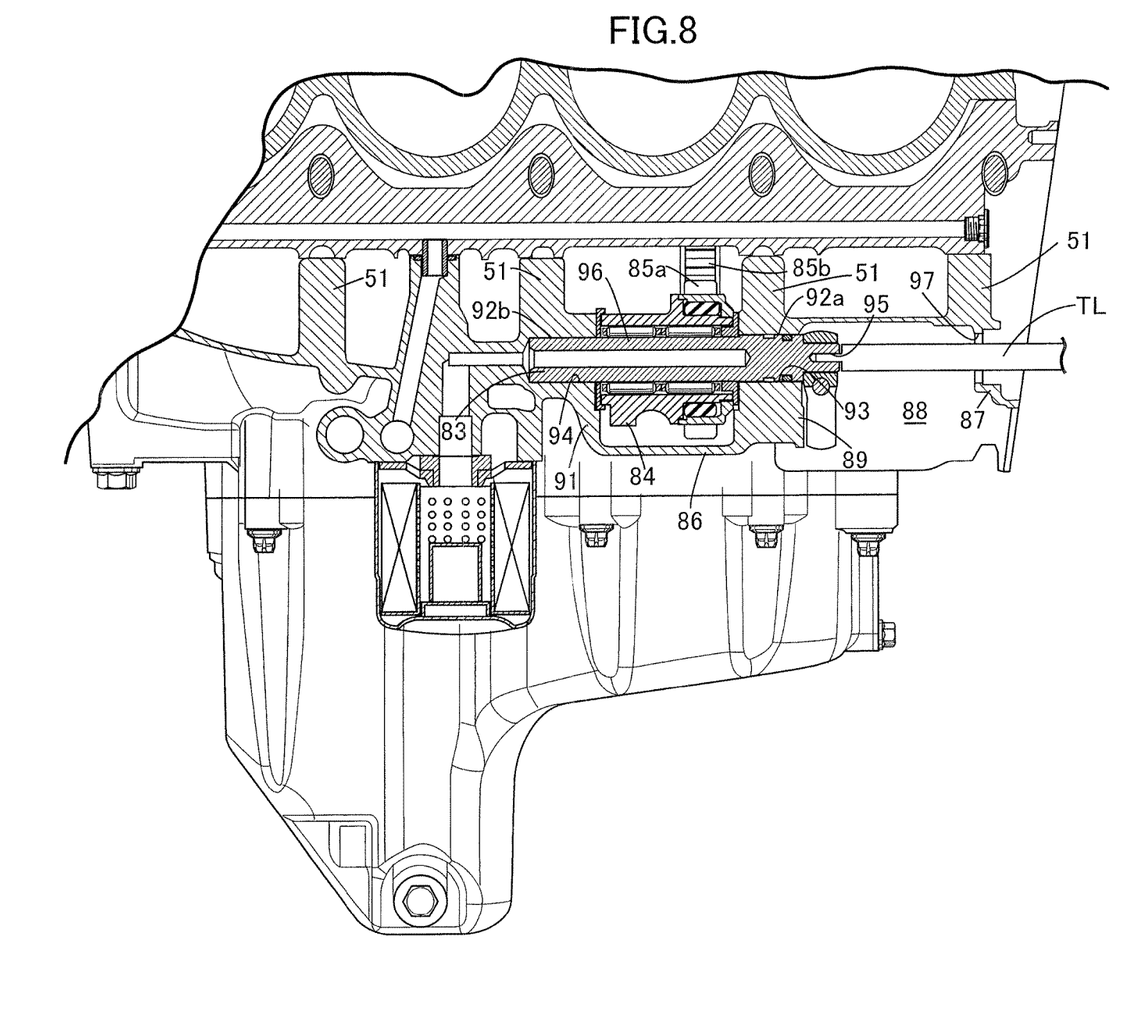
FIG. 8 is an enlarged partial sectional view corresponding to FIG. 6 and schematically illustrating a process of adjusting backlash with the balancer shaft.

The balancer shaft 83 is rotatably supported by the casing 86. When viewed laterally, the balancer shaft 83 is disposed outside the outer edge of the rotor 56 of the ACG 53. Therefore, when the ACG cover 54 is removed, the tip end of a tool TL inserted from the through-hole 97 is able to reach the groove 95 in the tip end of the balancer shaft 83 as illustrated in FIG. 8. When the balancer shaft 83 rotates in this state, the action of the eccentric shaft 96 causes the balancer driven gear 85a to approach and leave the driving gear 85b. Backlash adjustment is made between the balancer driven gear 85a and the driving gear 85b. Even after the rotor 56 of the ACG 53 is mounted on the crankshaft 46 through the through-hole 97, the balancer shaft 83 is adjustable through the through-hole 97.

What is claimed is:

1. An internal combustion engine comprising:
    a crankcase that supports a crankshaft rotatably around a rotation axis;
    a cylinder block that defines a plurality of cylinders;
    a partition wall that is formed on the crankcase to support a journal of the crankshaft with respect to each of the cylinders;
    a generator that is coupled to one end of the crankshaft at an outside of the crankcase;
    a wall body that is formed on the crankcase to accommodate the generator by sandwiching the generator between the wall body and a generator cover coupled to the crankcase from the outside;
    a casing that includes a casing wall, the casing wall being formed on the crankcase and, at a position apart from the wall body in an axial direction of the crankshaft, facing the wall body with a space contiguous to an outer surface of the crankcase sandwiched between the casing wall and the wall body; and
    a balancer shaft that has an axis thereof parallel to the rotation axis of the crankshaft, and is rotatably supported by the casing while one end of the balancer shaft protrudes from the casing wall into the space, wherein the casing supports another end of the balancer shaft, the casing being continuous from the partition wall corresponding to an inside-positioned cylinder out of the cylinders.

2. An internal combustion engine, comprising:
    a crankcase that supports a crankshaft rotatably around a rotation axis;
    a generator that is coupled to one end of the crankshaft at an outside of the crankcase;
    a wall body that is formed on the crankcase to accommodate the generator by sandwiching the generator between the wall body and a generator cover coupled to the crankcase from the outside;
    a casing that includes a casing wall, the casing wall being formed on the crankcase and, at a position apart from the wall body in an axial direction of the crankshaft, facing the wall body with a space contiguous to an outer surface of the crankcase sandwiched between the casing wall and the wall body; and
    a balancer shaft that has an axis thereof parallel to the rotation axis of the crankshaft, and is rotatably supported by the casing while one end of the balancer shaft protrudes from the casing wall into the space,
    wherein a through-hole is formed in the wall body, the through-hole being coaxial with the balancer shaft and larger in outside diameter than the balancer shaft.

3. The internal combustion engine according to claim 2, wherein
    a perforator for a support hole is insertable into the through-hole, the support hole being bored in the casing in relation to the balancer shaft.

4. The internal combustion engine according to claim 2, further comprising:
    a plug member that is inserted into the through-hole from the outside of the crankcase in order to plug the through-hole; and
    a retainer that is formed on the generator cover, the retainer being brought into contact with the plug member when the generator cover is coupled to the crankcase from the outside of the crankcase.

5. The internal combustion engine according to claim 1, wherein
    the balancer shaft is disposed outside an outer edge of a rotor of the generator when viewed laterally.

6. The internal combustion engine according to claim 1, wherein
    the crankcase includes an upper body and a lower body that are separated by a cut surface, and the axis of the balancer shaft is disposed below the cut surface, forward of the crankshaft, and above a horizontal plane in contact with a lower end of the rotor of the generator.

7. The internal combustion engine according to claim 2, wherein the balancer shaft is disposed outside an outer edge of a rotor of the generator when viewed laterally.

8. The internal combustion engine according to claim 2, wherein the crankcase includes an upper body and a lower body that are separated by a cut surface, and the axis of the balancer shaft is disposed below the cut surface, forward of the crankshaft, and above a horizontal plane in contact with a lower end of the rotor of the generator.

\* \* \* \* \*